(12) United States Patent
Dent

(10) Patent No.: US 6,195,555 B1
(45) Date of Patent: *Feb. 27, 2001

(54) METHOD OF DIRECTING A CALL TO A MOBILE TELEPHONE IN A DUAL MODE CELLULAR SATELLITE COMMUNICATION NETWORK

(75) Inventor: Paul W. Dent, Stehag (SE)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/881,253

(22) Filed: Jun. 24, 1997

Related U.S. Application Data

(63) Continuation of application No. 08/368,877, filed on Jan. 5, 1995, now abandoned, which is a continuation-in-part of application No. 08/179,958, filed on Jan. 11, 1994, now abandoned.

(51) Int. Cl.[7] .............................. H04Q 7/20; H04B 7/00
(52) U.S. Cl. ........................................ 455/456; 342/350
(58) Field of Search ...................... 455/456, 403; 342/350

(56) References Cited

U.S. PATENT DOCUMENTS

| | | | |
|---|---|---|---|
| 5,161,248 | * 11/1992 | Bertiger et al. | 455/17 |
| 5,214,789 | * 5/1993 | George | 455/33.2 |
| 5,235,633 | * 8/1993 | Dennison et al. | 379/60 |
| 5,268,694 | * 12/1993 | Jan et al. | 342/354 |
| 5,343,512 | * 8/1994 | Wang et al. | 379/59 |
| 5,400,392 | * 3/1995 | Nagashima et al. | 379/60 |
| 5,490,203 | * 2/1996 | Jain et al. | 379/59 |
| 5,502,757 | * 3/1996 | Bales et al. | 379/58 |
| 5,546,445 | * 8/1996 | Dennison et al. | 379/60 |
| 5,600,706 | * 2/1997 | Dunn et al. | 455/456 |
| 5,602,903 | * 2/1997 | LeBlanc et al. | 455/456 |
| 5,621,414 | * 4/1997 | Nakagawa | 342/350 |
| 5,664,006 | * 9/1997 | Monte et al. | 455/405 |

FOREIGN PATENT DOCUMENTS

| | | |
|---|---|---|
| 501 706 | 9/1992 | (EP) . |
| 536 921 | 4/1993 | (EP) . |
| 662 758 | 7/1995 | (EP) . |
| WO93/23965 | 11/1993 | (WO) . |

OTHER PUBLICATIONS

P.W. Baranowsky, "MSAT and Cellular Hybrid Networking," *Proceedings of the Third International Mobile Satellite Conference*, pp. 149–154, Jan. 1, 1993 (Abstract Only).

F.D. Priscoli, "Architecture of on Integrated GSM–Satellite System," *European Transactions on Telecommunications*, vol. 5, No. 5, Sep.–Oct., 1994, pp. 91–99.

* cited by examiner

*Primary Examiner*—William Cumming
(74) *Attorney, Agent, or Firm*—Burns, Doane, Swecker & Mathis, L.L.P.

(57) ABSTRACT

A method of directing a call to a mobile telephone in a dual mode cellular satellite communications network is disclosed. An alert signal is transmitted to the mobile telephone using base stations of the cellular network if the mobile telephone is currently registered as active in a cellular network. When the alert signal is received at the mobile telephone, the mobile telephone transmits a response to the cellular network as an acknowledgement. When an acknowledgement is not received by the cellular network within a defined period of time, the cellular network transmits the last known location of the mobile telephone to the satellite earth station. Upon receipt of the last known location of the mobile telephone, the satellite earth station using the last known location determines a satellite antenna beam most likely to be received by the mobile telephone and transmits an alert signal to the mobile telephone via the satellite using the antenna beam.

13 Claims, 7 Drawing Sheets

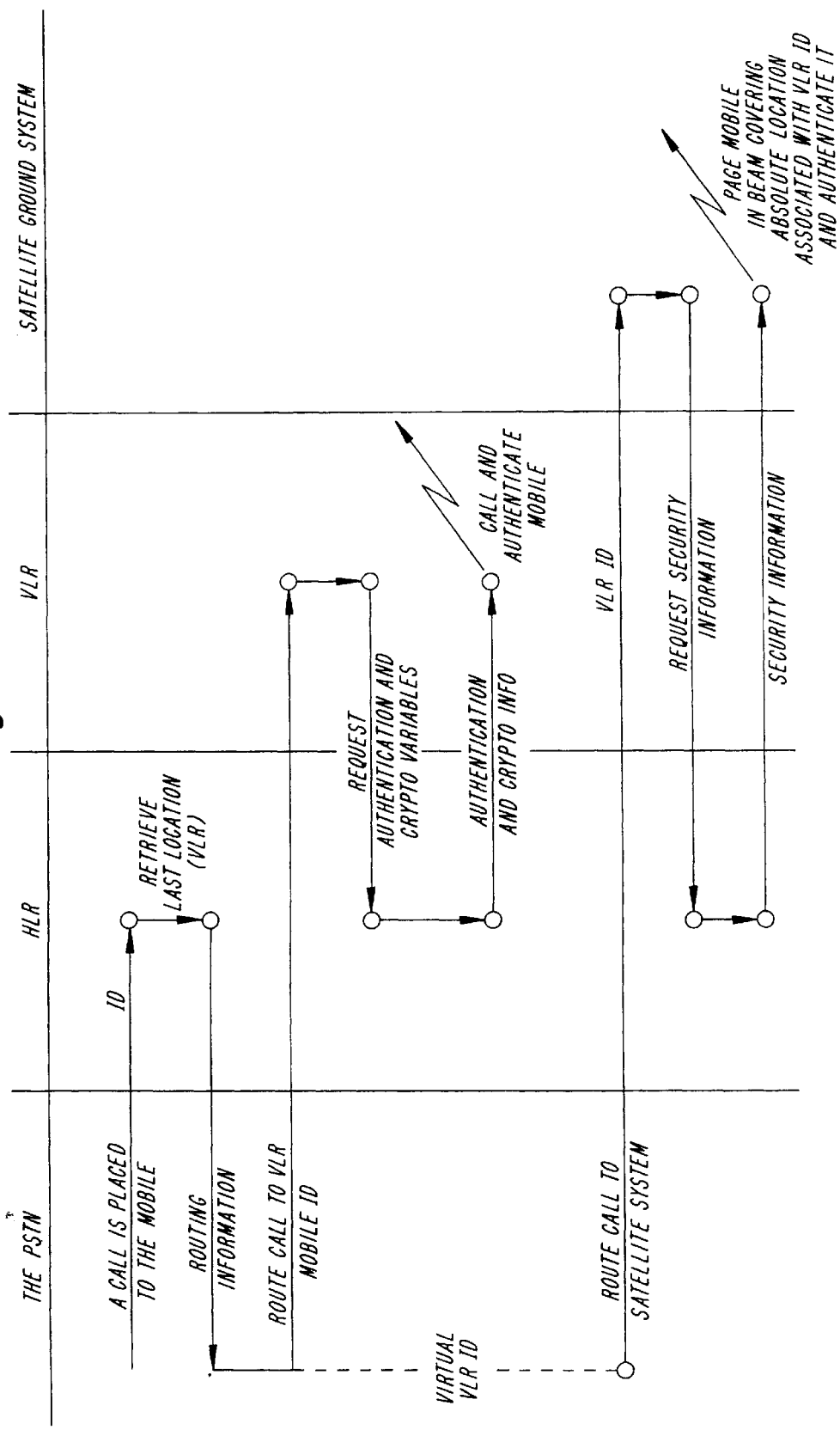

METHOD OF DIRECTING A CALL TO A MOBILE TELEPHONE IN A DUAL MODE CELLULAR SATELLITE COMMUNICATION NETWORK

This application is a divisional, of application Ser. No. 08/368,877, filed Jan. 5, 1995, now abandoned, which is a continuation-in-part of application Ser. No. 08/179,958, filed Jan. 11, 1994, now abandoned.

This is a continuation in part application of U.S. patent application Ser. No. 08/179,958, now abandoned filed Jan. 11, 1994, which is incorporated herein by reference.

FIELD OF THE INVENTION

The present invention relates to an improved satellite communication system for handling portable telephones, and particularly to the interaction between the satellite system and mobile phones which are in a standby mode.

BACKGROUND OF THE INVENTION

When mobile phones are in a standby or idle mode, the idle mobile phones must listen to a signal radiated by the communication system in order to recognize if and when the mobile phone is being called. An attractive communication system from the user's viewpoint would be a dual mode satellite/cellular telephone that would listen to and connect calls with a land-based cellular system if the mobile phone is in range, or to a satellite system when the land-based cellular system is not in range. The principle advantage of such a dual system is that the number of subscribers outside cellular coverage at any instant might only be a small fraction of the total number of subscribers, thus the number of subscribers needing to access the satellite system is reduced. This permits a satellite system of limited capacity to take on a much greater number of subscribers than its capacity would otherwise allow, perhaps 100 times the equivalent ratio in cellular systems. In addition, the number of subscribers actively listening to a calling channel, i.e., those in the idle mode, already exceeds the number actually involved in conversation by a factor of 20 to 200. As a result, the number of potential subscribers to a dual mode satellite/cellular system can be 2,000 to 20,000 times the satellite system's call capacity.

It is clear that in such a dual mode communication system, the network should preferably know whether a particular mobile phone should be called via the land-based cellular system or via the satellite system. However, to call every subscriber via both systems would pose a very severe calling channel load in view of the potential 100 fold increase in subscribers as mentioned above. Therefore, it is desirable to restrict calling/paging of subscribers via the satellite system to only those mobile phones that are known or suspected to be presently listening to the satellite calling channel. In a cellular communication system or a satellite communication system, it is necessary to restrict paging/calling areas to those areas in which a called mobile phone is thought to be located. Both cellular and satellite systems are more or less global and the paging capacity to call every mobile phone over the whole globe is hard to provide. This problem is solved by means of registration.

Registration means that a mobile telephone informs the network what calling channel it is presently listening to. The network then knows which of a number of limited paging areas the mobile telephone is most likely to be in, and calls to that mobile telephone can be broadcast to that paging area. This process can involve transmitting calls to a mobile telephone via several base station transmitters at different sites in the same paging area. This increases the paging load per transmitter, but reduces the network load for handling reregistrations, as a mobile telephone need no longer transmit a reregistration message every time it finds a stronger transmitter to listen to. In this example, the mobile telephone only needs to reregister when it detects that the transmission it switched to monitoring belongs to a different paging area than the previous one.

The above description of paging areas and reregistration criteria is well known in the art. It is, for example, used in the Pan European GSM cellular system.

To achieve an economically useful capacity to serve a large number of subscribers, satellite communication systems need to allow reuse of the available spectrum many times over the globe. This is achieved by the use of multiple spot beam antennas that divide the illumination of the chosen service area between many smaller regions. Ideally the available spectrum may be reused in each of the smaller regions by use of the invention described in U.S. patent application Ser. No. 08/179,953, entitled "A Cellular/Satellite Communication System With Improved Frequency Re-use", filed Jan. 11, 1994, which is incorporated herein by reference.

The most promising satellite systems for such applications might be considered to be those which are in a near earth orbit and stationary orbit. The disadvantage of satellites in stationary orbits is that huge antennas are needed to create the same size spot beams from the 40,000 km distance and the extra delay in signals traversing that distance creates a problem for two-way conversations. However, the disadvantage of satellites in near earth orbits is that the satellites move and thus the areas that the spot beams illuminate change as the satellites circle the earth. Even if steps are taken to steer the spot beams to more or less the same regions, the satellite will eventually pass over the horizon and will have to be replaced by a rising satellite. When this occurs, it must be avoided that the entire population of mobile telephones listening in the idle mode to a paging channel of the satellite which is about to pass over the horizon attempt to reregister simultaneously the fact that they are now listening to a new paging channel of the new satellite. As mentioned above, the number of mobile telephones in the idle mode is much greater than the satellite system's capacity to handle traffic. Therefore, the problem of bulk registration is difficult to handle.

SUMMARY OF THE DISCLOSURE

To solve the reregistration problems mentioned above, it is desirable to define paging areas in absolute earth related coordinates instead of satellite spot beam related coordinates. The satellite system knows what areas its various satellites and spot beams cover. Therefore, the system should be able to determine what beam to use to page a given mobile telephone if the approximate absolute position of the mobile telephone is also known. A typical diameter of a spot beam may be from 100 to 1000 km, so it suffices for a mobile telephone to determine and register its approximate position. According to one embodiment of the present invention, a simple method is provided for a mobile telephone to determine its absolute position within an accuracy sufficient to inform the network of which paging area it is located in.

According to one embodiment of the present invention, a method for determining the position of a mobile radio telephone in a satellite communication system is disclosed. First, a mobile radio telephone scans a plurality of paging channels and measures the signal strength of the paging channels. The mobile radio telephone then selects the paging channel with the strongest signal strength and decodes the information broadcasted on the selected channel. The information contained in the paging channel can include frequencies or timeslots of paging channels in surrounding spot beams. The mobile station then measures the signal strength of paging channels in surrounding spot beams and quantizes the measurements to determine a coarse position of the mobile radio telephone.

According to another embodiment of the present invention, a method for reregistering a mobile radio telephone in a satellite communication system is disclosed. First, a mobile radio telephone measures the signal strength of a plurality of paging channels and using broadcast information on instantaneous beam centers calculates an absolute position of the mobile radio telephone using the measured signal strengths and broadcast information. The mobile station then determines if the absolute position of the mobile station has changed by a predetermined amount and reregisters with the system when the absolute position has changed by said predetermined amount.

BRIEF DESCRIPTION OF THE DRAWINGS

These and other features and advantages of the present invention will be readily apparent to one of ordinary skill in the art from the following written description, used in conjunction with the drawings, in which:

FIG. 7 is a flow diagram of call information in the network according to one embodiment of the present invention.

DETAILED DESCRIPTION OF THE PREFERRED EMBODIMENTS

Figure 1:
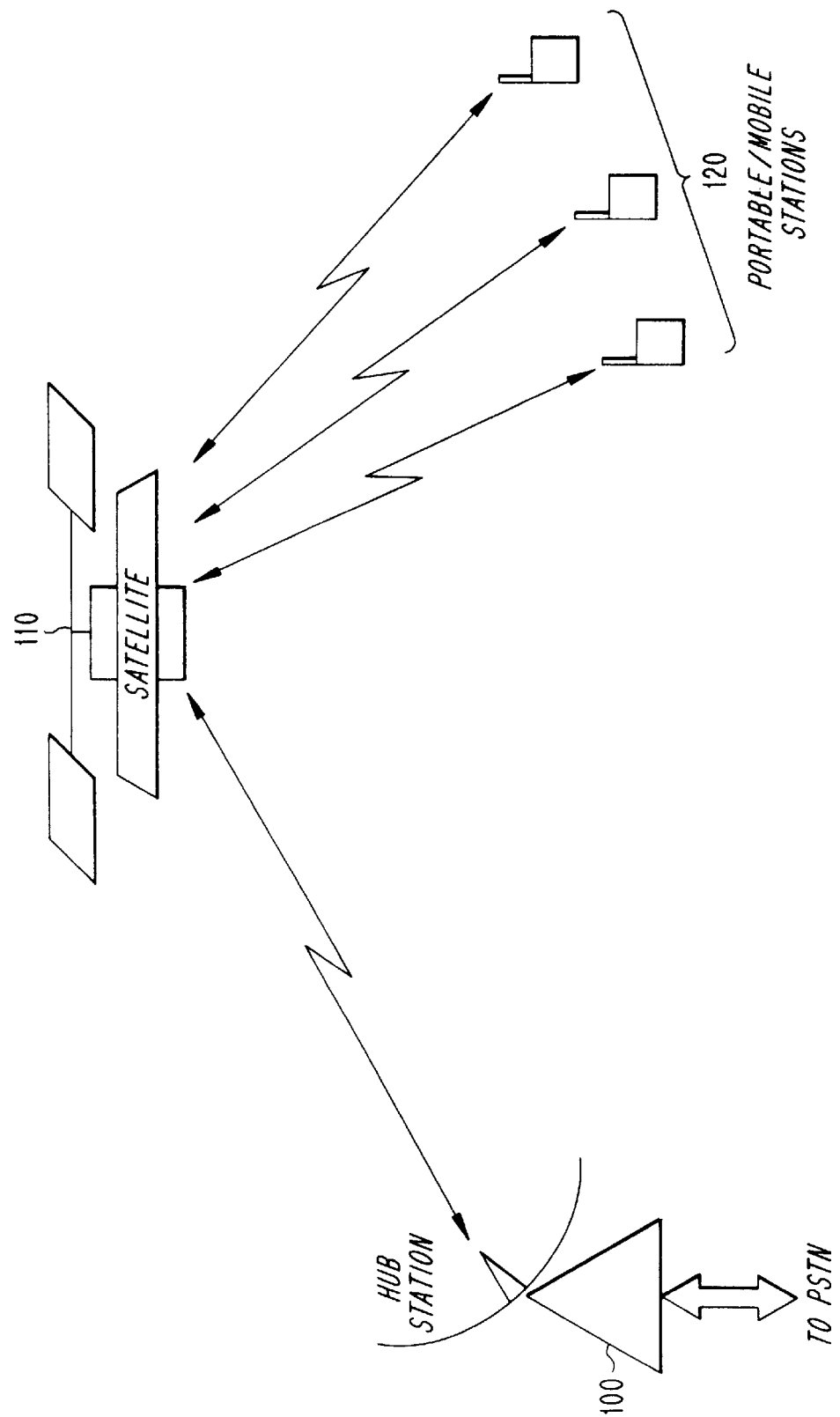
FIG. 1 illustrates a satellite communication system according to one embodiment of the present invention.

FIG. 1 illustrates a plurality of mobile radio telephones 120 in communication via satellite 110 with a hub station 100. The hub station is connected, for example via a local exchange, to the public switched telephone network PSTN to allow calls to be placed between the portable phones and any telephone subscriber worldwide, as well as between the satellite phones. The satellite 110 receives signals from the mobile radio telephones at a relatively low microwave frequency, such as 1,600 MHz. At this frequency, the transmitters in battery operated phones can be efficient and their antennas can also be small and omnidirectional. The satellite translates the received signal from 1,600 MHz to a higher frequency for relaying to the hub station. The reason for using a higher frequency is principally because the bandwidth needed on the satellite-to-hub link is at least n times the bandwidth allocated at 1,600 MHz for each beam, where n is the number of beams. For example, if a 6 MHz of bandwidth is reused in each of 37 beams at 1,600 MHz, then at least 37×6=222 MHz of bandwidth will be needed on the satellite-to-hub link. Since one simple method of maintaining coherent beam signal transport requires at least double this minimum bandwidth, and the reverse direction requires the same amount, one GHz of bandwidth may be needed which suggests that a carrier frequency around 20 GHz is appropriate for the satellite-to-hub forward and reverse links. At this frequency, even relatively small hub station dishes will have very narrow bandwidths so that exclusive use of this bandwidth by any one system is not necessary, and the entire bandwidth can be reallocated to other satellites and ground stations without interference as long as the straight line from a first ground station to a first satellite does not intersect with a second satellite. This is precluded by allocating unique "stations" to satellites in geo-stationary orbit or in the case of lower orbiting satellite that move, the probability of intersection is low and can be handled by having an alternative hub location which is activated when such an event occurs.

Figure 2:
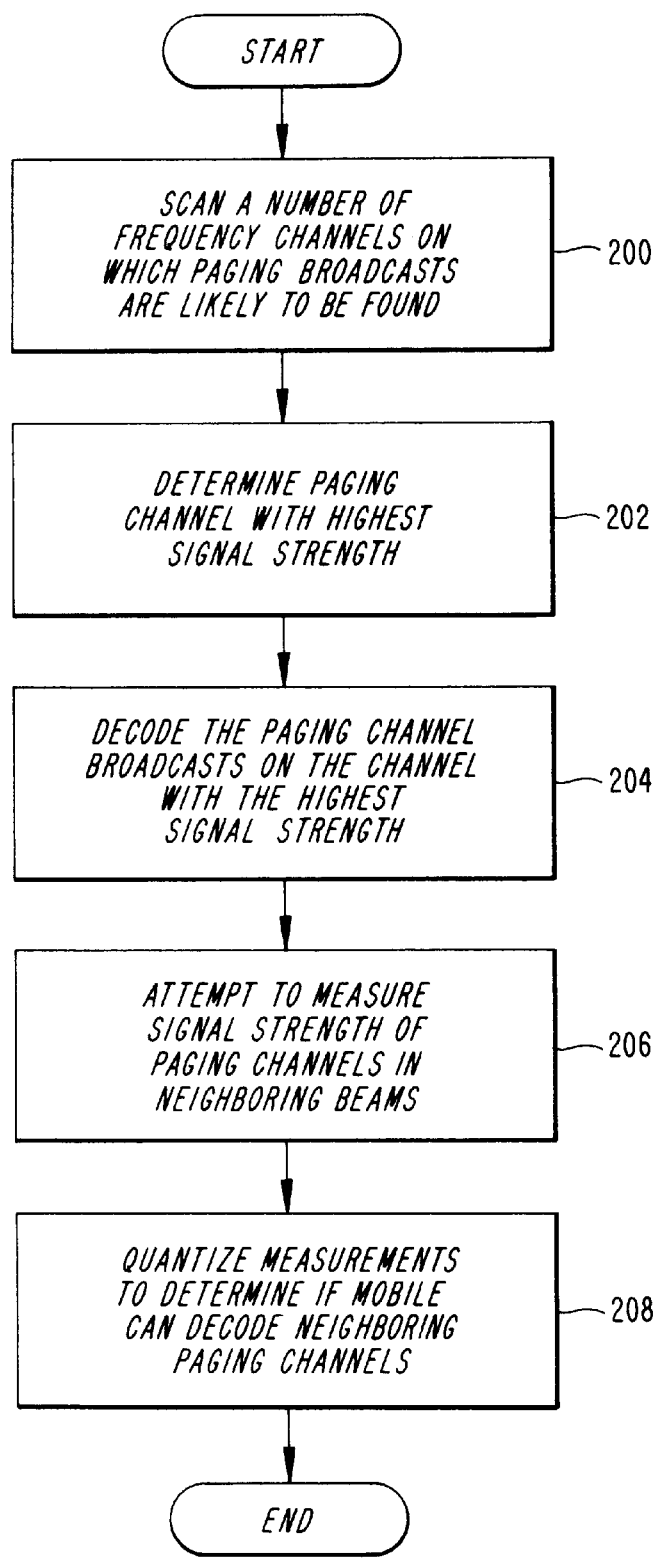
FIG. 2 is a flow chart of a method for determining the position of a mobile radio telephone according to one embodiment of the present invention.

According to one embodiment of the present invention, which is illustrated in FIG. 2, the mobile telephone scans a number of frequency channels or timeslots on which paging broadcasts are likely to be found in step 200. The mobile telephone then determines the paging channel with the highest signal strength in step 202. The mobile telephone decodes the paging channel broadcasts on the selected channel in step 204 and the mobile telephone obtains information on the frequencies or timeslots of paging channels in surrounding spot beams, as well as information on the current absolute coordinates of the center of the beam of the decoded paging channel. The mobile telephone then attempts to measure the signal strength of the paging channels in neighboring beams in step 206. The measurements can be coarsely quantized in step 208 to indicate, for example, whether the mobile telephone is able to decode neighboring paging channels at all, and if so, for what percentage of the time or with what bit error rate. This is facilitated when a much greater degree of coding is used on paging channels to help an ill-disposed mobile decode messages correctly.

The reason for preferring paging channels for the measurement of signal strength is that those channels are known to be permanently active. It is equally possible to make signal strength measurements on channels carrying telephone traffic, but these are likely to use so-called Discontinuous Transmission (DTX) the purpose of which is to save satellite transmitter power when one direction of the duplex telephone conversation is temporarily silent. Thus traffic channels that are actually in use may temporarily contain no signal, whereas paging channels are those which permanently contain signal. It may still be possible to determine signal strength using traffic channels if it can be determined whether or not they contain a valid signal, such as by ability to decode the signal correctly. This works so long as the signal strength is high but not when the signal strength is low.

Paging channels may consist of dedicated frequencies (as in an FDMA system) or dedicated timeslots (as in a TDMA system) or spread-spectrum transmissions using dedicated codes (as in a CDMA system) or indeed any hybrid of these. Whichever access method is employed, the term "paging channel" is intended to embrace any unique combinations of frequency, timeslots or codes used to broadcast paging information as opposed to traffic.

U.S. patent application Ser. No. 08/179,953, entitled "A Cellular/Satellite Communication System With Improved Frequency Re-use", filed Jan. 11, 1994, which is commonly assigned and incorporated herein by reference, describes how such channels can advantageously be radiated in slightly different directions so that each point on the earth is near the beam center of one channel. The aim is to provide the system with a number of channels to choose from that are more nearly centrally directed towards any particular mobile phone, thus avoiding the beam-edge loss that would occur for certain mobile locations if the beam pointing was not so staggered. To illustrate this, consider a greatly simplified case of a conventional system and a system according to above cited U.S. Patent Application, in which three communications channels are available.

For this illustration, FDMA can be assumed so that the three channels are in fact three different frequencies, which we will denote by black, red and green.

In a conventional system not employing the inventive method of the aforementioned U.S. patent application, a number of antenna beams, for example 37, would be provided as determined by the fixed physical characteristics of a satellite antenna system, and used to illuminate the earth in so-called spot coverage regions. According to conventional wisdom, the gain at the worst point, which lies midway between three spots, is maximized by choosing the beam width such that the gain is approximately 4dB down at the midway point relative to the peak, beam-center gain. This is according to conventional theory believed to be the optimum compromise between on the one hand reducing the peak gain by broadening the beam so as to reduce the edge loss, and on the other hand narrowing the beam to increase the peak gain but then suffering a greater beam edge loss the same distance off-center as before.

Having achieved this compromise, the conventional system would then have to decide whether all of the three frequency channels could be used in every one of the 37 touching beams, with the consequence that a mobile at the midway point between three beams would receive equal overlapping signals on each frequency from all three beams, i.e., two, equal-strength interferers on top of each wanted signal, or whether in order to avoid this interference problem the frequencies should be distributed between beams in a 3-cell frequency re-use pattern. In the latter case a mobile at the midway point between three beams would receive all three frequencies at equal strength from the three different surrounding beams, but one frequency only from each beam, with somewhat reduced interference from sidelobes of beams further away. A mobile at the mid point between two cells would receive equal signal strength on two frequencies and somewhat reduced signal strength from two equal signals on the third frequency. A mobile at the center of a cell of course receives principally the frequency of that cell with somewhat reduced signal strength on the other two frequencies from the six surrounding cells. Thus it is possible for a mobile station to obtain a rough idea of its position based on the relative signal strength on the three frequencies. We can further assume for the purposes of this illustration that the three frequencies in question are all paging channels, and that we have other sets of three to distribute in the same three-cell re-use pattern for passing telephone traffic. A mobile needs only to know its position to a sufficient accuracy to determine which beam or group of beams should broadcast a call to it. Informing the system through the satellite of this is the purpose of the registration procedure. In this illustrative conventional system, a mobile could quantize its position to:

1. Receiving principally RED beam no. k (k=1 to 12)
2. Receiving principally BLACK beam k (k=1 to 13)
3. Receiving principally GREEN beam k (k=1 to 12)
4. Receiving RED(i) and BLACK(j) more or less equally
5. Receiving RED(i) and GREEN(j) more or less equally
6. Receiving GREEN(i) and BLACK(j) more or less equally
7. Receiving RED(i), BLACK(j) and GREEN(k) more or less equally The above categories define six times as many subregions as there are beams, so it may be approximately said that a mobile can quantify its position to ⅙th of the area of one spot beam.

The mobile can use, as a criterion for which of the above categories it belongs to, whether the paging information broadcast in a beam is decodable with no errors or not. Paging messages and broadcast information are transmitted continuously on the paging channel and protected with both error correction and error detection coding. The error correction coding is preferably a convolutional code while the error detection is preferably a Cyclic Redundancy Check code (CRC). If the CRC of a decoded message checks on >50% of messages, the mobile can quantize that to "receiving a beam". If the CRC checks on <50% of messages, the mobile can quantize that to "not receiving the beam". Thus if "RECEIVING" is decided only for the GREEN beam and "NOT RECEIVING" is the quantized decision for the other colors, the mobile belongs to the category three. By reading the information in the green beam on its instantaneous center coordinates, the mobile takes those coordinates as its quantized (coarse) position. If however, "RECEIVING" is the quantized decision for all three color beams, the mobile is in category 7, and by reading the beam-center coordinates from the broadcast information, the mobile can calculate its position as midway between the three beams.

Clearly, finer degrees of quantizing can be used, such as receiving one color with 95% correct CRC, another with 45% correct CRC and the third with 15% correct CRC. In addition, correct decoding is not the only clue to position, but also signal strength. Relative signal strength could for example be quantized as follows:

1. RED beam no. k dominant (meaning others >6dB down)
2. BLACK beam k dominant (meaning others >6dB down)
3. GREEN beam k dominant (meaning others >6dB down)
4. RED and BLACK equal (meaning <6dB delta, but GREEN >6dB down)
5. GREEN and BLACK equal (meaning <6dB delta, but RED >6dB down)
6. GREEN and RED equal (meaning <6dB delta, but BLACK >6dB down)
7. ALL equal (meaning all within 6dB)

Also in the case of signal strength, it is not necessary to quantize too coarsely. Having determined how many beams can be decoded correctly at all, their relative signals strength can be used in a weighted averaging of their beam center coordinates, using stored or broadcast beam shape information if desired, in order to obtain a finer estimate of mobile position. As a further degree of sophistication, the estimates may be subjected to Kalman filtering that estimates both mobile position and velocity, with practical limits on the velocity. Especially in the case where the satellite beams move across the earth due to uncompensated satellite motion, the position estimates over a period of tens of minutes would be based on estimates falling in several different ones of the above categories, averaged by the Kalman filtering process.

Once such a position estimate is available, the mobile can determine if it has moved by a sufficient amount since last registration to warrant triggering re-registration. Re-registration is however triggered by an absolute mobile position change, and not by movement of the beams across the earth due to uncompensated satellite movement.

The above description of a conventional FDMA, 3-cell frequency re-use system may also be extended to the case where the three channels in question are three different timeslots in a TDMA system. In this case, the paging channel burst cycles periodically between three neighboring beams, and the mobile can, by receiving a whole cycle, determine from the amplitude changes whether it is principally in one beam (deep amplitude troughs in 2 of the three slots and strong signal in one), or midway between three beams (little or no amplitude modulation) and so on.

The description is now extended to the inventive beam configuration referenced in the aforementioned associated disclosure. In this inventive system, a beam direction is not necessarily restricted to those directions associated with particular physical antenna structures, but may take on a continuum of directions by use of electronic beam interpolation. For example, a mobile lying midway between three beams does not have to suffer a 4dB loss of signal whichever one it uses for communications, but by virtue of the satellite transmitting ⅓rd of the intended energy for that mobile coherently in all three cells, may receive a virtual or interstitial beam centered on that mobile. To optimize the minimum gain at all points such interstitial beams may be directed, a different optimization of beamwidths applies than the conventional one, and considerably higher minimum gains may be achieved with broadly the same antenna aperture.

Figure 6:
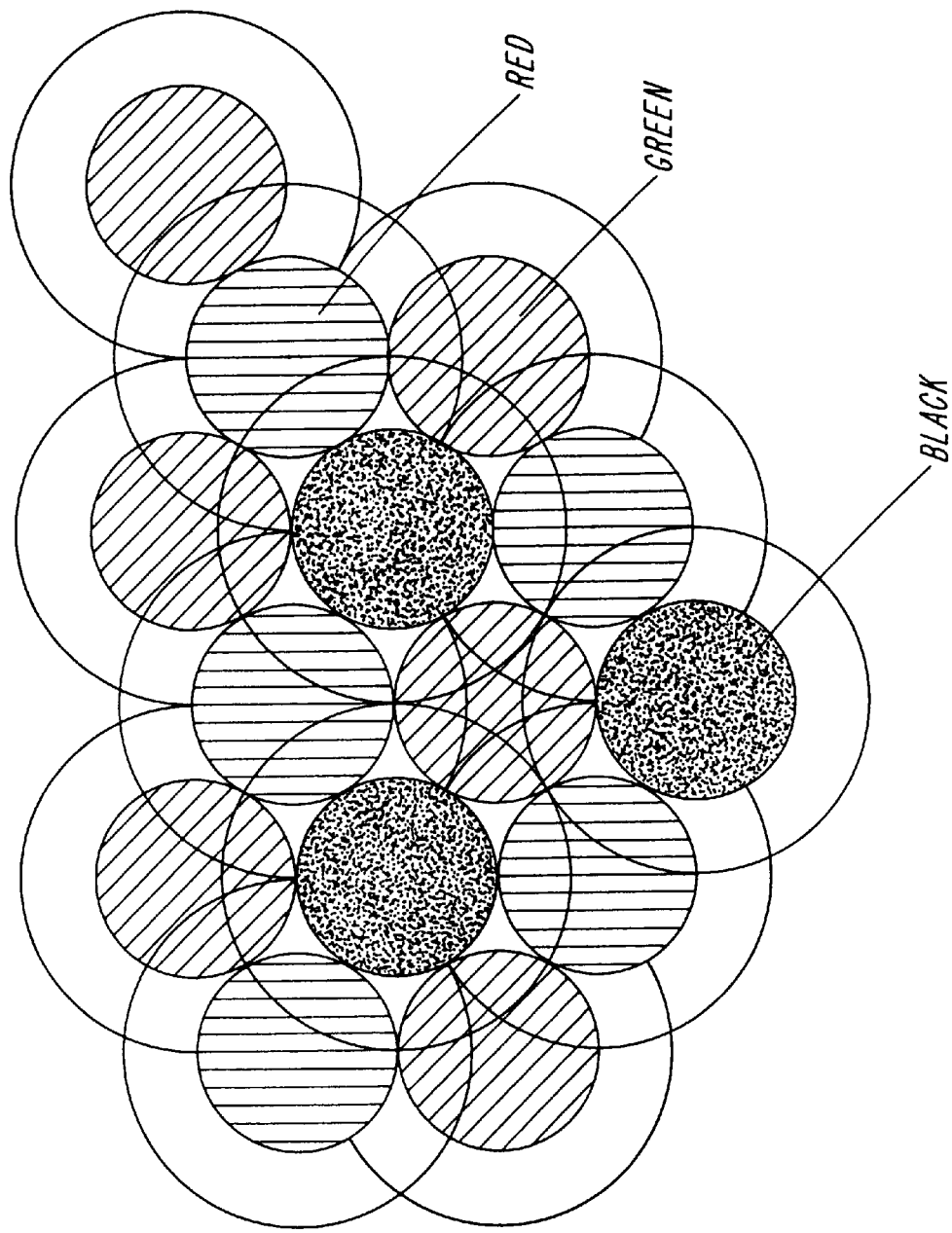
FIG. 6 is a diagram of the disposition of interstitial beams in a 3-color/3-channel example.

FIG. 6 illustrates the formation of interstitial red and green beams between a set of black beams that can be thought of as corresponding to the conventional beams. The large circles represent the conventional beam crossover diameters. In the conventional approach, beams are used for communication right out to their edge. The smaller circles show how much of the beam diameter needs to be used for communication in the inventive approach. The solid shaded areas of the black beams highlight this, indicating that mobiles using black beams only do so out to about 1/root(3) of the black beam diameter before a better option would be to switch to a red or green interstitial beam. In practice, many more communications channels than three are provided, and producing staggered interstitial beams for each means that each beam need only be used out to 1/root(N) of the conventional beam radius, where N is the number of channels.

Supposing an FDMA set of 256 frequencies are each associated with a set of virtual beams, the beam centers can in principle be disposed on a 16×16 grid of points within areas equivalent to the conventional spot beam coverage areas. The mobile station can, by making a measurement of signal strength on all 256 frequencies, construct a 16×16 2D plot of measurements from which its most likely position will be evident. The correct mathematical method of determining the most likely position is to fit a curve of known shape equal to the beam pattern to the measurements by finding the optimum North-South and East-West displacement of the curve that best fits the 16×16 measurements.

In a TDMA system of 256 time slots on a single carrier frequency, the beam centers can be programmed to move systematically through the 16×16 grid from timeslot to timeslot, and then repeat. It is easier in the TDMA case for the mobile to collect the 16×16 measurements, as it need only dwell on the same frequency for one TDMA frame to collect signal strength measurements on all timeslots, which are then processed by the two-dimensional curve fitting procedure mentioned above to determine a mobile position estimate. These estimates may then be further averaged by the aforementioned Kalman filter technique.

A supplementary device that the mobile telephone can employ to determine if paging channels are received weakly, even underneath co-channel interference, from traffic channels or paging channels in the current beam using the same frequency, is the subtractive demodulation process disclosed in co-assigned U.S. Pat. No. 5,151,919, which is incorporated herein by reference. The technique disclosed therein involves decoding the strongest of a number of overlapping signals and subtracting the decoded signal out of the received signal and then decoding the next strongest signal. As a result, the weak signals from the paging channels can be decoded with better accuracy by decoding and subtracting out the stronger interfering signals.

In addition, the mobile telephone can also make signal strength measurements on traffic channels that it can decode. Different channels may be simply different TDMA time slots on the same frequency and not necessarily different frequencies. In some satellite communication systems, the energy from the satellite can be redirected on a time slot by time slot basis to respective mobile telephones and conversations, so that the spot beam can be considered to be swinging around within a limited region in a manner known to the system. Therefore, reporting when, i.e., in which time slot, the mobile telephone gets greater or lesser signal strength, can provide strong clues as to its present location.

Figure 3:
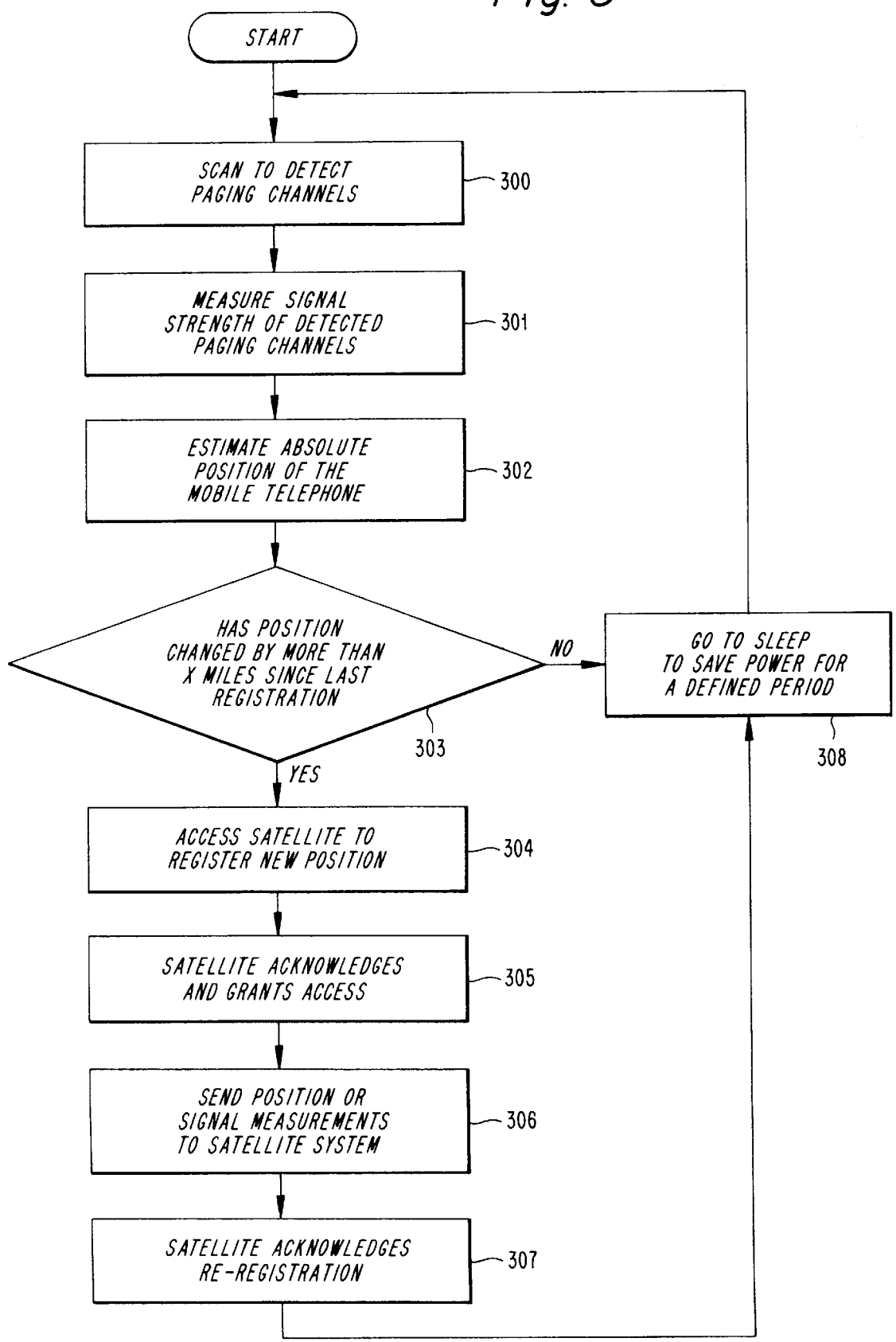
FIG. 3 is a flow chart of a method for reregistering a mobile radio telephone in a satellite communication system according to another embodiment of the present invention.

A mobile having just been switched on may have moved position since it last registered in the satellite system. To ensure that the mobile can be reached, it must be determined whether the mobile has moved, and if so, re-register with a new position. Consequently, the mobile scans the satellite signals to find paging or active traffic channels on which it can make signal measurements. This is shown in step 300 of the flow chart illustrated in FIG. 3. The mobile then measures the signal strength of the detected paging channels in step 301. If the mobile does not have a current registration with the satellite, the mobile is in any case going to register and thus does not need to determine if its position has changed before accessing the satellite. In this case, the mobile can proceed to step 304 in which the mobile attempts to access the satellite. The satellite responds by granting the mobile access in step 305, which can if desired involve temporarily allocating a traffic channel to the satellite for a more prolonged exchange. It would be preferable therefore if the mobile had determined and conveyed its position estimate to the satellite already in access request step 304, but alternatives are also disclosed here; for example, the satellite system can determine in which one of all its virtual beams it received the mobile random access signals the strongest, and estimate the mobile position in the same way as the mobile estimates its position from the satellite signal measurements. Thus, the satellite can unaided if necessary estimate which traffic channel and beam combination would suit the mobile best. One reason for a more prolonged interchange can be that the satellite system wishes to perform an authentication of the mobile station so that a pirate mobile is not able to corrupt the registration information stored in a genuine mobile.

If however the mobile is not sure that it needs to re-register because a previous registration seems to be still current, the system does not want to generate an unnecessary re-registration load. Therefore, the mobile should determine its own position before attempting to transmit to the satellite in step 302. This step requires that information on current beam center positions broadcast on the paging channels be read by the mobile station and used in position estimation along with signal measurements. The mobile station then proceeds to step 303, where the new position estimate is compared with the position estimate associated with the last registration. If the mobile has moved more than a threshold amount, for example, by more than −1dB beam radius, then the mobile proceeds to step 304 to re-register. On the other hand, if the mobile has not moved by more than the threshold amount, the mobile proceeds to step 308 where it enters a power shut down mode to save power and starts a timer. When the timer generates a wake-up alarm, which is arranged to coincide almost exactly with instants on the selected paging channel when the mobile can be paged (i.e. its sleep-mode time slot), the mobile rescans the paging channels, making signal measurements which the mobile uses to update its position estimate, and the cycle then repeats.

If the mobile has determined that it needs to re-register in step 303 and proceeds to step 304, the mobile can suitably convey any position estimate or measurements which it has made to the satellite already in the access request, if room in the data format exists for both this and the mobile's ID of at least 34 bits. The mobile could optionally, if room in the format exists, send a position estimate if available, or signal measurements if not. It may be possible for measurements to exist without the mobile being able to make a position estimate due to it being unable to read any information on the paging channel regarding beam center positions. This might for example be temporarily unavailable due to system malfunction such as a faulty link between the satellite tracking system and the paging transmitter.

If it is possible to provide the satellite position or signal information already in step 304 or during a prolonged interchange in step 306, or subsequent communications, the satellite system has the option of combining these with its own measurements of the mobile signal to obtain a refined position. This refined position can optionally be returned to the mobile in step 307 while acknowledging the re-registration. The mobile station would in that case remember the refined position for comparison with future estimates in step 303. The satellite system also stores the mobile position in its memory against the mobile's ID and may also convey that position in coded form to the mobile station's cellular Home Location Register.

In the context of a dual mode satellite/cellular communication system, a more frequent and troublesome reregistration problem can arise. Consider when a mobile telephone listens to a paging or calling channel in a satellite system rather than a cellular calling channel in a land-based cellular system, for instance upon loss of the cellular signal. The loss of cellular signals can be quite a frequent occurrence in mobile telephones mounted in automobiles traveling down a highway. On a busy highway, between two major cities, for example, a gap in cellular coverage may exist at a particular place, and every mobile with a satellite/cellular phone might attempt to reregister with the satellite system as it enters the zone not covered by the cellular system. This is not normally a problem for cellular systems, as when no coverage exists, the mobile telephone does not attempt to reregister. Furthermore, the size of cells in cellular systems is perhaps 100 times less in area than satellite cells, so the above described systematic reregistration load can be easily handled. However, such a mass reregistration may cause problems for a satellite system. It is therefore another object of the present invention to avoid undue satellite reregistration due to the regular passage of vehicles through a hole in cellular coverage.

Figure 4:
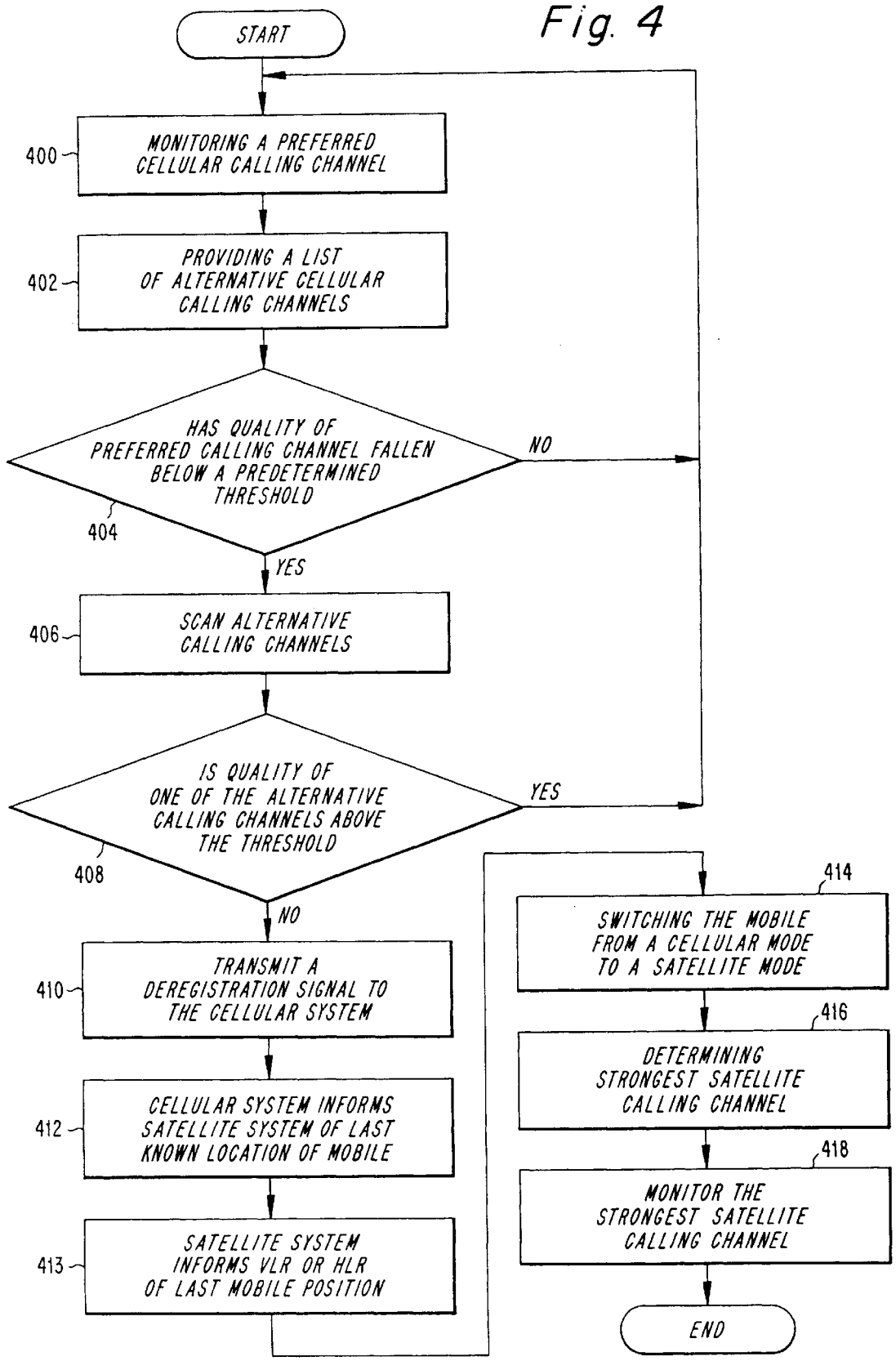
FIG. 4 is a flow chart illustrating another embodiment of the present invention.

According to one embodiment of the present invention, as illustrated in FIG. 4, mobile telephones that are locked to the cellular communication system monitor a preferred calling channel in step 400 but also have a list of neighboring calling channels which can be used as alternatives in the event of loss of signal. A paging area comprises a number of base stations that a calling message for a mobile will be simultaneously transmitted from. It is desirable to transmit a calling message on a group of surrounding base stations to avoid the mobile having to continually re-register as it wanders along the boundary between two base stations. The network would simply know that the mobile was listening to one of the two base stations, or others, and transmit a page on all of the base stations. Such a group of stations transmits a "paging area ID", so that a mobile can detect when it switches to listening to a base station in a group with a different paging area ID; only in this event would re-registration be called for.

Normally, a base station broadcasts a list of surrounding stations' calling channel frequencies which can be received by the mobile in step 402. If the mobile detects at step 404 that the currently monitored base station signal quality falls below a predetermined threshold, the mobile scans the list of alternative calling channel frequencies in step 406 and switches to one of the alternative channels in step 408 if it has a signal quality above the threshold. In certain systems, for example TDMA systems, the mobile may have spare time between monitoring the current base station in certain timeslots in which it can effectively continuously scan the alternative list without waiting for the signal quality of the current station to degrade.

If the mobile switches to monitoring a different base station, the mobile station need not re-register unless the paging group ID is no longer the same. The new base station will however broadcast another list of calling channel frequencies of the base stations surrounding it, which the mobile now scans. Eventually, the mobile may switch to a station not in the original paging group thus necessitating a re-registration procedure.

In the prior art, each mobile gets the same list of surrounding base stations from its currently monitored base station, and paging areas are thus defined by the system to be the same for each mobile. In U.S. patent application Ser. No. 07/882,607, a method for providing each mobile with a customized paging area is disclosed. The technique is to download a list of alternative calling channels at re-registration specifically for that mobile. The network remembers these and knows that a particular mobile station shall be paged on all of these channels. Thus, the paging area for a mobile can be re-centered around the actual position of each mobile upon re-registration, delaying the time when re-registration may again become necessary. On the other hand, if no alternative calling channel meets the signal quality criteria in step 408, the mobile can, before moving too far from the current base station, report that it is entering a "black hole" by effecting a deregistration with the cellular system in step 410. The cellular system then informs the satellite system of the last known position of the mobile within the cellular system in step 412, which is a sufficiently accurate position for the satellite system to be able to determine the appropriate paging beam for the mobile station. The mobile telephone then switches from the cellular mode to a satellite mode in step 414. The mobile telephone then determines the strongest satellite calling channel in step 416 and then monitors the selected paging channel in step 418. The mobile telephone then estimates its absolute position from signal strength measurements without needing to register with the satellite system, thus avoiding registration load on the satellite. Alternatively, the cellular system can include information on an appropriate satellite paging channel in the list of alternative channels it downloads.

The mobile estimates its absolute position from the satellite signal upon deregistration from the cellular system so that if, subsequently in its journey it detects that its position has changed by more than the threshold in step 306 without having again found a cellular signal, it can at that time effect a re-registration directly with the satellite system. It is fairly sure that this would not represent an unnecessary re-registration, given that it must have been out of cellular contact for at least several hours and several hundred kilometers.

An alternative to the step 412 in which the cellular system informs the satellite system of the last known mobile position within the cellular system may be understood by recalling that a caller for a dual mode satellite/cellular mobile is not necessarily routed to the satellite system in the first instance, but to the mobile phone's "Home Location Register" which resides in a mobile switching center belonging to the cellular operator with which the phone has a subscription. In the alternative step 413, either the satellite system or the cellular system can inform the Home Location Register or a Visitor Location Register of the last known position of the mobile phone. According to the previous description of how a mobile phone is reached when locked to the satellite system instead of the cellular system, the mobile's current location and call routing information shall be lodged in the HLR in terms of a VLR ID. The VLR or Visitor Location Register is provided in foreign cellular switching centers to hold information on non-native mobiles that are temporarily registered in their areas. The entire PSTN cannot however know where each mobile is currently registered, only where a mobile's native switch is, i.e., the route to a mobile's HLR. The route to the VLR on which a mobile is currently registered is thus first retrieved by a PSTN caller from the HLR.

FIG. 7 illustrates an example of the flow of call information in such a system. When a call is placed to a mobile, the PSTN contacts the mobile's HLR to determine the last position (the VLR ID or a virtual VLR ID). When the call is routed to the cellular system, the call is routed to the VLR using the VLR ID stored in the HLR. The VLR then requests authentication and crypto information from the HLR. The VLR then sends out the call and authenticates the mobile. However, when the call is routed to the satellite system, the virtual VLR ID is sent to the satellite ground station which requests security information from the HLR. After the satellite ground system has received the security information, the mobile is paged in a satellite beam covering the absolute location associated with the VLR ID.

It suffices therefore that the cellular system, upon deregistration of a mobile, lodges an appropriate virtual VLR ID associated with an absolute position known to the satellite system. This however requires that cellular switching systems be reprogrammed to lodge a default virtual VLR ID in the HLR whenever the mobile deregisters from that cellular region. The default VLR ID has to be provided by the satellite system utilizing this invention and is the VLR ID associated with the absolute satellite paging area in which the VLR is located. Other alternatives exist, all of which are considered to be within the spirit and scope of this invention. For example, the VLR from which the mobile has just deregistered can merely inform the HLR that the mobile is no longer registered with it. The HLR responsible for offering dual-mode satellite/cellular subscriptions then has the onus of determining what satellite virtual VLR ID to replace the last visited VLR ID with by default. This can in turn involve the HLR contacting the satellite system to receive this information. Alternatively, only the ID of the nearest satellite gateway is lodged in the HLR by default. The satellite gateway would, if a call is rerouted to it, determine the last known absolute position of the mobile from its memory, or by using the last known VLR ID supplied by the HLR. The goal of such alternatives is to eliminate the need to reprogram all cellular systems to accommodate dual-mode satellite/cellular phones, and to limit any reprogramming requirements only to systems offering dual-mode subscriptions, or even limiting such programming to elements of the satellite system.

Yet another alternative deemed to be within the spirit and scope of the present invention is that the VLR upon a mobile deregistering does not inform the HLR of the change. Only when the PSTN next attempts to call the mobile will the HLR receive notification from the VLR that the mobile is no longer registered. The HLR then by default contacts a satellite switching center and informs it of the last VLR ID with which the mobile registered. The satellite system can have a stored map relating VLR IDs to its own absolute paging areas, and route the call to the paging area in which the mobile most likely will be found. Upon the mobile initiating a call, the problem is resolved in that the satellite system is now positively informed of the mobile's position and it can be properly registered in the satellite system and the appropriate virtual VLR ID lodged with the HLR if appropriate. If the satellite gateway the call was routed to was not the desired one, the gateway may inform the HLR of an alternative gateway route. This can depend on how the system operators wish to handle routing and billing for different legs of the connection.

Since the cellular system is presumed to have adequate capacity for registration, even for mobile telephones emerging regularly from a systematic "black hole", the satellite to cellular reregistration issue is not a capacity issue, so much as a power consumption issue for hand held mobile telephones. It is not desirable when using battery power to listen to the satellite system and also simultaneously listen to the cellular system. According to another embodiment of the present invention, deregistration of the mobile in the satellite system is avoided by instead reregistering the mobile in the cellular system when the mobile detects that it is possible to register with the cellular system. A method for detecting when it is possible to register with the cellular system is described below. In this case, the cellular system can notify the satellite system by a deregistration signal via land lines, for example, that the mobile telephone no longer needs to be paged by the satellite system. This is of course unnecessary when all calls to a mobile from the PSTN will in any case first be referred to the HLR to obtain current location information. It suffices then to overwrite the virtual VLR ID or gateway VLR ID of the satellite system with the address of the physical cellular VLR with which the mobile has just re-registered.

In the GSM system, a subscriber with a particular service providing company has a corresponding data record on one of that company's cellular telephone exchanges or switches. The record is called the home location register or HLR and it contains an entry for the last known position of the mobile telephone in the communication system. For example, if a mobile telephone is taken to another GSM country and switched on, it will determine which calling channel has the strongest signal strength and then send a registration request to the foreign system. The request will indicate the home country HLR and the foreign system will contact the HLR by international circuits in order to obtain data authenticating the identify of the mobile telephone. Upon successful authentication, the mobile is registered on the foreign system in a visiting location register (VLR) and the location of the mobile station will be sent to be stored at the HLR. Thereafter, the telephone system will refer any calls by any caller in the world first to the HLR automatically to obtain the current VLR location, and then to the VLR. The above described method is one embodiment of the present invention; however, in some cases, old exchanges can not understand re-routing instructions and the speech signals must be routed through the HLR, known as "tromboning".

In accordance with the present invention, when a dual mode mobile telephone sends a deregistration message to the cellular system, the cellular system contacts the HLR to change the data of the current location from the VLR to the satellite system. In addition, the absolute location is lodged in the HLR so that the satellite system can obtain it or optionally so that the HLR can forward the location to the satellite system. The reverse process takes place when the mobile phone reregisters from the satellite to a cellular system. To avoid the need to change the software of all VLRs to perform satellite related location and registration functions, as an alternative, the VLR performs its normal functions. The HLR on which the phone is registered as having satellite capability then has the task of determining the equivalent satellite system coordinates by looking up in a table the information pertaining to the VLR from which a registration or deregistration of one of its mobiles was received. The HLR can then if necessary inform the satellite system of approximate mobile position.

Still, power consumption for portable mobile telephones is a problem when the cellular and satellite modes operate at the same time. This can arise when a mobile telephone is locked to the satellite in the absence of cellular signals, as there must be a method for detecting when a cellular calling channel again becomes receivable. Normally, it does not take much battery power to listen to a cellular calling channel, as special features have or will be implemented in future cellular systems to reduce the standby power of mobile telephones. Sleep mode groups is the primary candidate technique used, in which a mobile is assigned to a subgroup of mobiles according, for example, to the last digit of the telephone number or the sum of the digits of its telephone number, and calls to that group are transmitted only in certain time slots that the mobile can anticipate and wake up to receive. Thus, the mobile station can spend at least 90% of the time powered down. The mobile can however, only enter the sleep mode when locked to a calling channel and having identified its sleep mode group.

Figure 5:
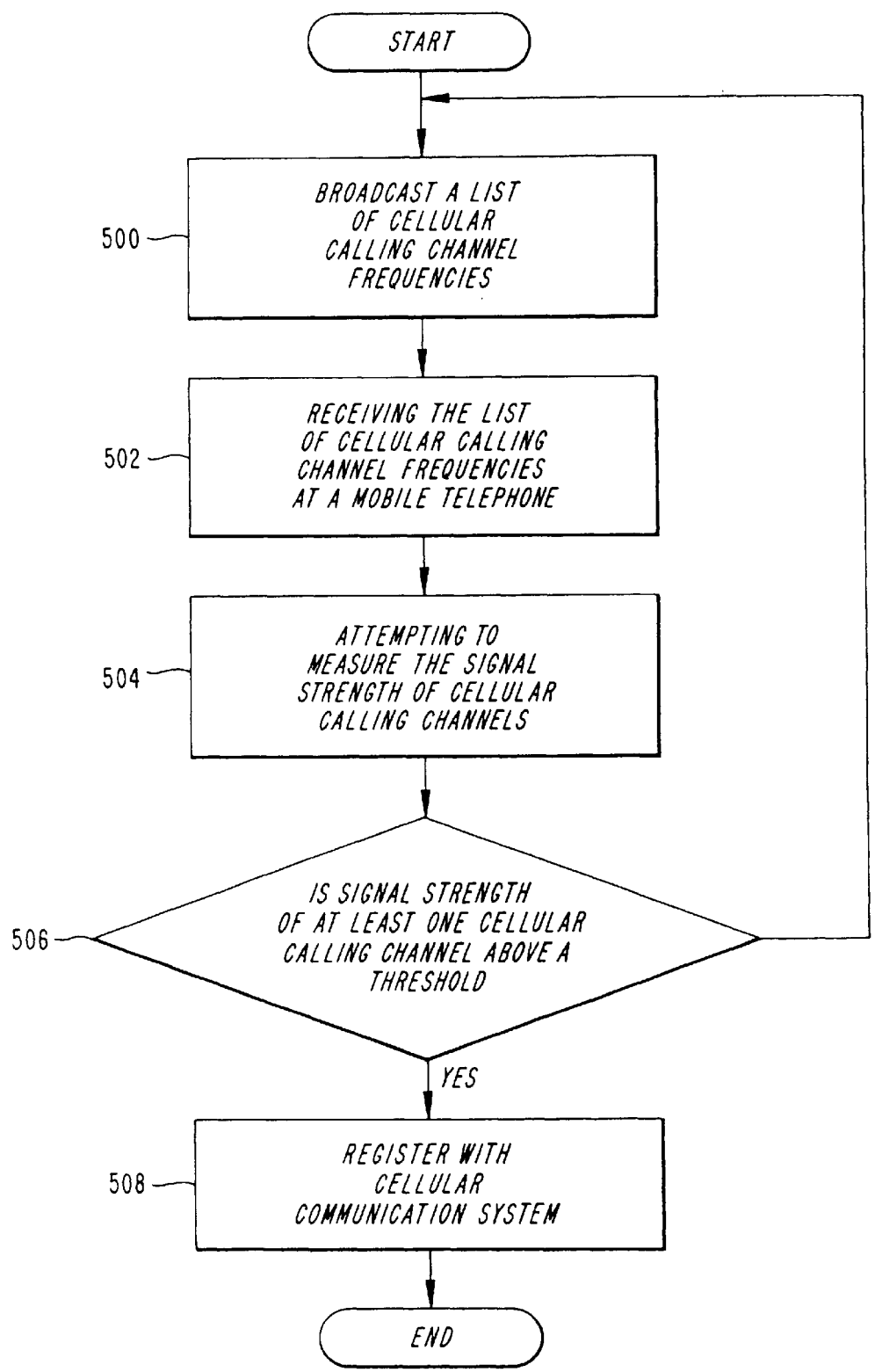
FIG. 5 is a flow chart illustrating another embodiment of the present invention.

According to the present invention, the satellite calling channel also implements sleep mode groups which allows a mobile phone to activate its satellite calling channel mode for only a fraction of the time. In principle, the mobile can wake up for a second fraction of the time, say one millisecond every 20 milliseconds in order to scan one of the 1,000 cellular channels. The channel containing significant energy would then be identified in 20 seconds, which may be an adequate response time for transferring from satellite mode back to the cellular mode. However, both power consumption and response time can be improved by having the satellite calling channels broadcast a list of cellular calling channels that exist within the area currently illuminated by the calling channel beam. As is illustrated in FIG. 5, each satellite paging channel broadcasts a list of cellular calling channel frequencies in step 500. A mobile telephone then receives the list of calling channel frequencies in step 502 and attempts to measure the signal strengths of the cellular calling channels in step 504. Mobiles in the cellular black holes that are listening to the satellite calling channel temporarily can then limit the list of possible calling channel frequencies from 1,000 to perhaps 21, on the basis that calling channels can reuse the same frequencies in a 21 cell reuse pattern. As a result, it is only necessary to inform the mobile of what frequencies have been chosen in a given area. In the case of mobiles that can operate in more than one cellular standard, the calling channel standard as well as the frequency can be indicated eg., AMPS channel 137 or GSM channel 104.

By using the sleep mode, the mobile telephones only then need to activate their cellular receivers for perhaps 21 to 63 milliseconds out of every 20 seconds to check for the presence of any receivable calling channels. The active time will in fact be determined by the speed at which the cellular synthesizer can change frequency, and is probably minimized by waking up the cellular receiver once every 20 seconds and scanning all potential calling channels as fast as the cellular synthesizer can change frequency and then going back to sleep.

The mobile telephone then determines whether the signal strength of one of the calling channels is above a predetermined threshold in step 506. The mobile telephone then registers with the cellular communication system in step 508 if one of the cellular calling channels has a signal strength above the predetermined threshold.

U.S. patent application Ser. No. 08/305,652 describes a method of directing a call to a mobile telephone in a satellite or land-cellular communications network comprising the steps of first transmitting a call at a normal power level in a most likely cell or group of cells forming a paging area, and upon non-acknowledgement of the first call, transmitting a second call at a higher power in the paging area and optionally simultaneously calling at a normal power in an extended paging area. The technique disclosed in U.S. patent application Ser. No. 08/305,652 is complementary to and may be used in combination with the present invention to provide an improved probability of successfully alerting a mobile telephone of an impending call. The aforementioned disclosure does not disclose transmitting a deregistration message from the mobile phone to the cellular network upon detection of imminent deterioration of quality of all receivable cellular signals. Rather, the aforementioned disclosure discloses continuing to direct calls to the mobile phone first via base stations in the last known paging area. Implicitly a time out period is invoked for receiving an acknowledgement from the mobile phone of this first call. Upon expiration of the time-out period, a second call is transmitted at a higher power or in a wider paging area. The disclosed procedure may be incorporated into the present invention as the preferred method of calling a mobile phone via the cellular network. The disclosed procedure may then be applied a second time as the preferred method of calling the mobile phone via the satellite network. In other words, transmitting a call in a "most likely beam" as indicated by a clue sent to the satellite system from the cellular network, and upon non-acknowledgement within a time-out period, transmitting a second call in the most likely beam at a higher power or transmitting a second call in a number of beams forming a wider satellite paging area, or both. In addition, the combined procedure may be employed by exhausting all modes of cellular calling first and then continuing to proceed through a number of modes of satellite calling until either the mobile replies or all attempts are exhausted, at which point a "temporarily unavailable or switched off" message may be sent to the calling party. The calling party may then be directed to a voice mailbox or short message service, similar to an alphanumeric paging service. All combinations of the incorporated disclosure with the present invention are deemed to be within the scope and spirit of the current invention.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A method of directing a call to a mobile telephone in a dual-mode cellular-satellite communications network, comprising the steps of:

transmitting an alert signal to said mobile telephone using base stations of said cellular network if the mobile telephone is currently registered as active in a cellular network;

receiving said alert signal at said mobile telephone;

transmitting a response to said cellular network as an acknowledgement;

upon non-receipt of said acknowledgement by the cellular network within a defined period of time, transmitting a last known location of the mobile telephone from said cellular network to a satellite earth station; and upon receipt of said last known location of the mobile telephone at said satellite earth station, using said last known location to determine a satellite antenna beam most likely to be received by said mobile telephone and transmitting an alert signal to said mobile telephone via a satellite using said antenna beam.

2. A method of directing a call according to claim 1, further comprising the steps of:

receiving the alert signal at the mobile telephone; and transmitting a response from said mobile telephone via said satellite acknowledging said alert signal.

3. A method of directing a call according to claim 1, further comprising the steps of:

receiving said acknowledgement transmitted via said satellite at the satellite earth station;

allocating a traffic channel for communicating with said mobile telephone and completing a two-way connection between said mobile telephone and a calling party.

4. A method of directing a call according to claim 1, wherein said alert signal transmitted from the cellular network comprises a first attempt at a first power level and a second attempt at a higher power level in a likely paging area and simultaneously at said first power level in a wider paging area.

5. A method of directing a call according to claim 1, wherein said alert signal transmitted from said cellular network comprises a first attempt transmitted in a last known paging area and a second attempt transmitted in a wider paging area.

6. A method of directing a call according to claim 1, wherein said alert signal transmitted using said satellite antenna beam comprises a first attempt at first power levels and a second attempt at a higher power level.

7. A method of directing a call according to claim 2, further comprising the step of:

upon non-receipt at a satellite earth station of said acknowledgement from said mobile telephone, transmitting a further attempt using said satellite in an extended satellite paging area.

8. A method of directing a call according to claim 3, further comprising the step of:

transmitting an indication from said satellite earth station to a cellular network that the mobile telephone is reachable via said satellite earth station.

9. A method of directing a call according to claim 1, wherein said alert signal transmitted from said cellular network comprises a first attempt at a first power level and a second attempt at a higher power level.

10. A method of directing a call according to claim 7, wherein said extended satellite paging area comprises several beams.

11. A method of directing a call according to claim 7, wherein said extended satellite paging area comprises a beam of wider bandwidth.

12. A method of directing a call according to claim 7, further comprising the step of transmitting said further attempt in said first satellite paging area at an increased power level.

13. A method of directing a call according to claim 7, further comprising the step of transmitting said further attempt in said first satellite paging area using increased error correcting coding.

* * * * *